(12) United States Patent
Shirinskaya et al.

(10) Patent No.: US 12,442,788 B2
(45) Date of Patent: Oct. 14, 2025

(54) MULTI-GATE OECT BASED SENSOR

(71) Applicants: ECOLE POLYTECHNIQUE, Palaiseau (FR); CENTRE NATIONAL DE LA RECHERCHE SCIENTIFIQUE, Paris (FR)

(72) Inventors: Anna Shirinskaya, Orsay Ville (FR); Yvan Bonnassieux, Paris (FR)

(73) Assignee: ECOLE POLYTECHNIQUE; CENTRE NATIONAL DE LA RECHERCHE SCIENTIFIQUE (FR)

( * ) Notice: Subject to any disclaimer, the term of this patent is extended or adjusted under 35 U.S.C. 154(b) by 385 days.

(21) Appl. No.: 17/626,255

(22) PCT Filed: Jul. 9, 2020

(86) PCT No.: PCT/EP2020/069464
§ 371 (c)(1),
(2) Date: Jan. 11, 2022

(87) PCT Pub. No.: WO2021/005187
PCT Pub. Date: Jan. 14, 2021

(65) Prior Publication Data
US 2022/0276199 A1   Sep. 1, 2022

(30) Foreign Application Priority Data
Jul. 11, 2019 (EP) .................................. 19305930

(51) Int. Cl.
*G01N 27/414* (2006.01)
(52) U.S. Cl.
CPC ................ *G01N 27/4145* (2013.01)

(58) Field of Classification Search
CPC .................................................. G01N 27/4145
See application file for complete search history.

(56) References Cited

U.S. PATENT DOCUMENTS

| | | | |
|---|---|---|---|
| 7,482,620 B2 | 1/2009 | Kugler et al. | |
| 8,810,888 B2 | 8/2014 | Andersson Ersman et al. | |
| 9,733,209 B2 | 8/2017 | Seong et al. | |
| 2015/0115227 A1* | 4/2015 | Yan | G01N 27/4145 438/49 |
| 2016/0041155 A1 | 2/2016 | Takulapalli | |

(Continued)

FOREIGN PATENT DOCUMENTS

| | | | |
|---|---|---|---|
| EP | 3045902 A1 * | 7/2016 | ......... G01N 27/4146 |
| WO | 2003046540 A1 | 6/2003 | |
| WO | 2018/234905 A1 | 12/2018 | |

OTHER PUBLICATIONS

Shirinskaya M.A., Physical modeling of biosensors based on organic electrochemical transistors, PhD thesis, CNRS, 2017 (Year: 2017).*

(Continued)

*Primary Examiner* — Luan V Van
*Assistant Examiner* — Shizhi Qian
(74) *Attorney, Agent, or Firm* — Jason A. Smith; Shumaker, Loop & Kendrick, LLP

(57) ABSTRACT

An organo electro chemical transistor based sensor including at least one set of source and drain electrodes, a plurality of gate electrodes for this set, at least one channel connected to the source and drain electrodes of the at least one set; and at least two gate electrodes being differently functionalized.

10 Claims, 3 Drawing Sheets

(56) References Cited

U.S. PATENT DOCUMENTS

| | | | |
|---|---|---|---|
| 2017/0336347 A1 | 11/2017 | Ram et al. | |
| 2018/0013082 A1* | 1/2018 | Allen | H10K 71/50 |
| 2020/0348259 A1* | 11/2020 | Torsi | G01N 33/5438 |
| 2021/0128030 A1* | 5/2021 | Inal | A61B 5/14532 |
| 2021/0148854 A1* | 5/2021 | Torsi | G01N 27/4145 |

OTHER PUBLICATIONS

Tybrandt et al., Organic electrochemical transistors for signal amplification in fast scan cyclic voltammetry, Sensors and actuators B: Chemical, 2014, 195, 651-656 (Year: 2014).*
Macchia et al., Ultra-sensitive protein detection with organic electrochemical transistors printed on plastic substrates, Flex. Print. Electron., 2018, 3, 034002 (Year: 2018).*
Espinosa et al., Detection of different target-DNA concentrations with highly sensitive AlGaN/GaN high electron mobility transistors, Sensors and actuators B: Chemical, 2015, 210, 633-639 (Year: 2015).*
International Search Report (ISR) for PCT/EP2020/069464 mailed Sep. 29, 2020 (6 pages).
Written Opinion (WO) for PCT/EP2020/069464 mailed Sep. 29, 2020 (8 pages).
Anna Kirchan et al. "A Pedot: PSS-based organic electrochemical transistor with a novel double-in-plane gate electrode for pH sensing application" 2017, 19th International Conf. on Solid-State Sensors, Actuators, and Microsystems, IEEE, Jun. 18, 2017, p. 214-217, XP033130739.
Klas Tybrandt et al. "Organic electrochemical transistors for signal amplification in fast scan cyclic voltammetry" Sensors and Actuators B: Chemical, vol. 195, Feb. 4, 2014, p. 651-656.
Loa G. Kergoat et al. "Advances in organic transistor-based biosensors: from organic electrochemical transistors to electrolyte-gated organic field-effect transistors", Analytical and Bioanalytical Chemistry, Springer, Berlin, DE, vol. 402, No. 5, Sep. 11, 2011, p. 1813-1826.
Ning Liu et al. "Flexible Sensory Platform Based on Oxide-based Neuromorphic Transistors", Scientific Reports, vol. 5, No. 1, Dec. 11, 2015, XP055731043.
Pappa, A et al, R.M. (2017) "Organic electronics for point-of-care metabolic monitoring", 28 pages.
Bernards et al., "Enzymatic sensing with organic electrochemical transistors", J. Mater. Chem., 2008 vol. 18, pp. 116-120.
Piro et al., "Fabrication and Use of Organic Electrochemical Transistors for Sensing of Metabolites in Aqueous Media", Applied Sciences, 2018 vol. 8, No. 928, 33 pages.
Jia et al., "Electrochemical Tattoo Biosensors for Real-Time Noninvasive Lactate Monitoring in Human Perspiration", Anal Chem. Jul. 2013;85(14) 6553-6560. doi:10.1021/ac401573r. PMID: 23815621.
Lin, Peng, et al. "Organic Electrochemical Transistors Integrated in Flexible Microfluidic Systems and Used for Label-Free DNA Sensing." Advanced Materials 23.35 (2011): 4035-4040.
Zhu et al., "A simple poly(3,4-ethylene dioxythiophene)/poly(styrene sulfonic acid) transistor for glucose sensing at neutral pH", Chemical communications 13 (2004): 1556-1557.
Tarabella et al., "Lipsome sensing and monitoring by organic electrochemical transistors integrated in microfluidics", Biochimica et Biophysica Acta (BBA)—General Subjects 1830.9 (2013): 4374-4380.
Macaya et al., "Simple glucose sensors with micromolar sensitivity based on organic electrochemical transistors", Sensors and Actuators B: Chemical 123.1 (2007): 374-378.
Macchia et al., "Ultra-sensitive protein detection with organic electrochemical transistors printed on plastic substrates", Flexible and Printed Electronics 3.3 (2018): 034002.
Tang et al., "Highly sensitive dopamine biosensors based on organic electrochemical transistors", Biosensors and Bioelectronics 26.11 (2011): 4559-4563.

* cited by examiner

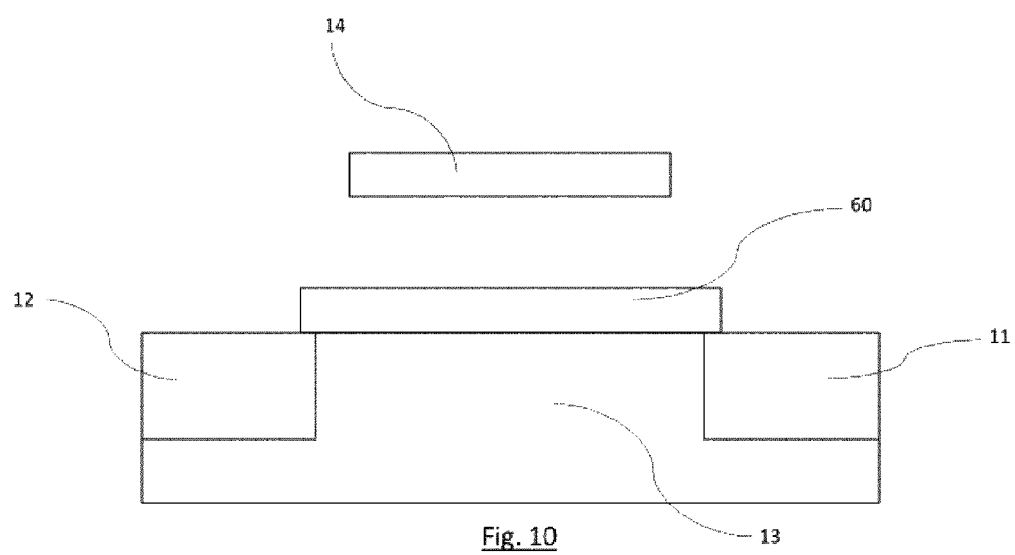

MULTI-GATE OECT BASED SENSOR

FIELD OF THE INVENTION

The present invention relates to Organic Electro-Chemical Transistor (OECT) based sensors.

BACKGROUND

OECT based sensors are known in the prior art.

A typical OECT consists in source, drain and gate electrodes and a conductive polymer layer that forms a conductive channel extending between the source and drain electrodes.

The gate electrode is usually immersed into an electrolyte in contact with the channel.

A main working principle of an OECT as a sensor is based on charge transfer between an analyte of interest and the gate electrode or charge accumulation on the surface of gate electrode, which results in a change of the potential of the electrolyte, as described by the Nernst equation. If the gate stays at a constant potential, a potential drop change at the gate/electrolyte interface leads to a potential drop at the electrolyte/channel interface, and therefore the drain current is influenced by analyte concentration. The current modulation is generated by a de-doping effect induced by a reduction of the conductive polymer to its neutral, non-conducting state. Since the amount of charge carriers in the conductive polymer is decreased, current between source and drain electrodes also decreases.

OECT based sensors may prove efficient devices for detecting various analytes in different liquid media.

Functionalized OECT gate electrodes have already been used for glucose, lactate, liposome, dopamine, DNA and bacteria detection as well as for ultrasensitive detection of proteins, such as Immunoglobulin G.

Examples of OECT based sensors are disclosed in WO2003046540 A1, U.S. Pat. No. 7,482,620 B2, US88100888B2 and U.S. Pat. No. 9,733,209B2.

Further OECT based sensors are disclosed in Pappa, A et al, R. M. (2017) Organic electronics for point-of-care metabolic monitoring. Trends in biotechnology, Macaya, D et al, G. G. (2007) simple glucose sensors with micromolar sensitivity based on organic electrochemical transistors. Sensors and Actuators B: Chemical, 123(1), 374-378, Tang, H. et al, F. (2011). Highly sensitive dopamine biosensors based on organic electrochemical transistors. Biosensors and Bioelectronics, 26(11), 4559-4563, Piro, B. et al, S. (2018). Fabrication and use of Organic Electrochemical Transistors for Sensing of Metabolites in Aqueous Media. Applied Sciences (2076-3417), 8(6).

WO 2018/234905 discloses a field-effect transistor (FET) biosensor that may include several gate electrode plates. As for EP 3045902, it discloses an electrolyte-gated sensor that may include several gate electrodes. Both applications do not relate to the field of OECT sensors.

It is also disclosed in Kirchan, A et al, A PEDOT: PSS-based organic electrochemical transistor with a novel double-in-plane gate electrode for pH sensing application, an OECT based sensor having a double gate electrode. This double gate electrode is connected to a single source and cannot be regarded as two distinct gate electrodes. Therefore, this publication does not disclose any OECT sensor having a plurality of gate electrodes, and even less with at least two gate electrodes being differently functionalized.

Further OECT based sensors are also disclosed in Tybrandt, K et al Organic electrochemical transistors for signal amplification in fast cyclic voltammetry. This publication discloses an OECT having four circular sensing gate electrodes of different diameter intended to be used one at a time to allow for optimal matching of the capacitance of the sensing gate electrode to the channel capacitance. This publication does not disclose any OECT having at least two gate electrodes being differently functionalized.

There remains a need for improving further OECT based sensors, especially for reducing the cost of production of these sensors, improving reliability and durability thereof and/or increasing precision and compactness.

The invention aims at satisfying all or part of these needs.

SUMMARY OF THE INVENTION

Exemplary embodiments of the invention relate to an Organic Electro-Chemical Transistor based sensor, comprising:
  at least one set of source and drain electrodes,
  a plurality of gate electrodes for this set,
  at least one channel connected to the source and drain electrodes of the at least one set.

Thanks to the invention, a same OECT based sensor may be used if desired for sensing different analytes in a medium, by functionalizing each gate electrode for detecting a given analyte.

A further advantage of the invention is the simplification of the production procedure since a same set of source and drain electrodes may be used for a plurality of gate electrodes. The quantity of materials used for making the source and drain electrodes may be reduced. This may also help reduce the space needed for the electrodes and help achieve greater miniaturization of the sensor. In addition, the electronics used for acquisition of the signals may be simplified as the number of connections is reduced thanks to the use of a same set of source and drain electrodes for more than one gate electrode.

The sensor is also compatible with the use of the relatively cheap technique of ink jet printing for its manufacture.

The sensor may comprise a depolarization gate.

The depolarization gate is useful to accelerate measurement.

During normal measurement, potential applied between source and the functionalized gate de-dopes the channel and pushes ions inside the conductive layer. For the next measurement, it is desirable to pull ions out from the channel; normally, this process starts slowly as soon as gate-source potential is off Use of a depolarization potential which is opposite to previously applied functionalized gate—source potential accelerates ions extraction from the channel. The depolarization gate is preferably turned on after each measurement, to bring the channel to its initial state as fast as possible.

Preferably, the depolarization electrode is an electrode dedicated only to depolarization and that is not used to perform measurement. This depolarization electrode may be unfunctionalized.

Gate Electrodes

The gate electrodes may be two, three, four or more. The gate electrodes of a same sensor are individually addressable.

At least one gate electrode may be functionalized.

The gate electrodes may be identical or different.

At least two gate electrodes may be identical. At least two gate electrodes may be made of different materials.

If at least two gate electrodes are identical, or if more or all of them are identical, they may be used for increasing the accuracy of the measurements and/or reliability of the sensor. For example, the gate electrodes may be addressed in a sequence and the corresponding measured values of source-drain current averaged.

The gate electrodes may be different and at least two of them may be functionalized differently in order to detect different respective analytes.

Thus, the gate electrodes may be differently functionalized gate electrodes.

A functionalized gate electrode for detecting an analyte is preferably configured so that the analyte binds to this gate electrode and a flow of electrons results from this reaction, which can be detected by a variation of the source-drain current. Potential could change not only as a result of chemical reaction (faradaic process) but also as a result of charge accumulation on the surface of gate electrode, which is a non-faradaic process.

All gate electrodes may be functionalized differently for detecting a maximum number of different analytes.

The material of the gate electrodes may be selected based on the analyte to be detected and the medium in which said analyte is present.

The materials in which the gate electrodes are made include metals, alloys, organic and inorganic conductors or semi-conductors.

The gate electrodes may be left unfunctionalized or be functionalized. Functionalization of the gate makes it selectively sensitive to a given analyte. Functionalization of the gate could be achieved by biomolecules such as enzymes, proteins, organic or inorganic nanoparticles, RNA or DNA to assure enzymatic or non-enzymatic detection of inorganic molecules, small organic molecules and biological molecules in a liquid environment. At least two gate electrodes may be functionalized to be sensitive to a same analyte, but to different concentrations thereof.

The gate electrode may comprise a conductive base layer of a metal or a conductive polymer, for example Ag, Au, Pt or other metals. This conductive base layer may be coated at least partially with a layer of a functionalized polymer. A metallic surface may also be functionalized directly, for example antibodies may be covalently attached to a surface of a gold electrode. The functionalized polymer may comprise a surface modified conductive polymer, such as for example PEDOT: PSS treated with a deposit of a functionalizing layer. The functionalized polymer may be printed on the electrode base layer. The electrode base layer may be produced by annealing a metallic ink layer, or by evaporation or sputtering.

The position of the gate electrodes with respect to each other and with respect to the other electrodes and the at least one channel may be selected based on the application.

The gate electrodes may be symmetrical relative to a center of symmetry or an axis of symmetry.

The gate electrodes may have a same outline, for example polygonal or circular, or different outlines.

The gate electrodes may be coplanar with the drain and source electrodes or may not be coplanar with them.

A coplanar configuration may prove advantageous as it renders easier the manufacture of the sensor by printing, with an inkjet printer for example.

The source and drain electrodes are preferably coplanar on a same substrate, for example glass. The gate electrodes may be coplanar with the source and drain electrodes.

The gate electrodes may in a variant be supported by a different substrate than the source and drain electrodes. This allows to use materials and methods for gate electrode fabrication that are not compatible with methods used to fabricate the channel, source and drain electrodes.

The gate electrodes on the one hand and the source and drain electrodes on the other hand may extend in respective parallel planes. For example, the gate electrodes are carried by a substrate and the source and drain electrodes are carried by a different substrate. This facilitates gate electrodes replacement and the adjustment of the distance between the gate electrodes and the channel by adjusting the space between the substrates.

The gates electrodes may be connected to a control circuit by wires or conductive tracks.

The gate electrodes may each have different geometries, planar or not planar.

As detailed below, the sensor may comprise at least one depolarizing electrode.

The gate electrodes may be each connected sequentially to the ground and to a source of potential.

Channel(s)

The channel connects the source and drain electrodes, and is made of an electronically conductive material. The channel is able to change its conductivity by changing its redox state under an applied source-gate potential. The channel is connected with each gate electrode by means of an ionically conductive layer, in which all gates may be inserted simultaneously.

The channel could be fabricated from n- or p-type material to allow penetration and track an influence from different types of ions existing in the solution in which detection takes place.

The channel may be made of an electrically conductive polymer or a combination of polymers selected from polyfluorenes, polyphenylenes, polypyrenes, polyazulenes, polynaphthalenes, polypyrroles, polycarbazoles, polyindoles, polyazepines, polyanilines, polythiophenes, polyacetylenes, and copolymers thereof.

In a more particular implementation, the electrically conductive polymer is selected from poly(3,4-ethylenedioxythiophene) (PEDOT), polyaniline (PANI), polypyrrole (PPy), poly(phenylene vinylene) (PPV), poly(arylene), polyspirobifluorene, poly(3-hexylthiophene) (P3HT), poly (o-methoxyaniline) (POMA), poly(o-phenylenediamine) (PPD), poly(p-phenylene sulfide) or mixtures thereof.

The channel may comprise as conductive polymer a polythiophene-based polymer, especially poly(3,4-ethylenedioxythiophene) (PEDOT). The polythiophene-based polymer, in particular PEDOT, is generally combined with one or more counterions, such as triflate (OTO, triflimidate, tosylate (OTs), poly(styrenesulfonate) (PSS), mesylate (Ms). In particular, the conductive polymer may be PEDOT: PSS.

The sensor may comprise only one channel. This channel is connected to the source and drain electrodes. The material of the channel may contact the material of the source and drain electrodes, and partially overlap them.

The sensor may also comprise more than one channel. All channels may be connected to the same set of source and drain electrodes, and thus be submitted to the same applied potential between these electrodes.

In a variant, the sensor comprises more than one channel and each channel is connected to a respective set of source and drain electrodes. This enables to apply various potentials to the various channels for more precise study of an analyte of interest.

When the sensor comprises a plurality of channels, the channels may be identical or different.

At least two channels may differ by at least one of their geometric features, such as width, thickness or length. The at least two channels may also differ from the n- or p-type of material. For example, one channel is made of n-type material and the other channel is made of p-type material, which allows penetration and track from different types of ions existing in the solution in contact with the sensor.

By having at least one geometric feature, such as length, width and/or thickness, that is different between at least two channels, one may tune the sensitivity of the sensor and obtain different response time which may help in determining the nature of a charged species existing in the detected analyte.

The potential applied across each channel may also be different from one channel to the other, which allows to extract more information about the size, shape and/or charge of the ions that exist in the analyte under detection.

When the sensor comprises a plurality of channels, each channel is preferably individually addressable.

The channel(s) may be covered by a ion-selective membrane. The ion-selective membrane may be useful to filter species in the analyte that penetrate into the channel in order to measure only selected species. The ion-selective membrane may comprise at least one ionophore specific to a particular ion, for example specific to sodium, potassium, lithium, hydrogen, calcium, magnesium or ammonium ions.

In the variant where the sensor comprises more than one channel, at least one channel may be covered by an ion-selective membrane and the other(s) may be uncovered. In a variant, at least two channels may be covered by different ion-selective membranes, for example membranes that are specific to different ions.

Method of Production

The invention also relates to a method for producing a sensor according to the invention, as defined above, comprising ink jet printing of the source, drain and gate electrodes.

The method may comprise functionalizing differently at least two gate electrodes.

If the gates are closely situated, and are both functionalized, a hydrophobic layer may be deposited to cover a space extending around the gates to prevent a functionalization solution leaking and touching other gates.

Detection Method

The invention also relates to a method of detecting at least one analyte in a medium, using a sensor according to the invention, as defined above, the method comprising:
  selecting a gate electrode, in particular selecting a unique gate electrode,
  applying a predefined potential to the selected gate electrode, and
  determining a concentration of an analyte based on a current measured between the source and drain electrodes during application of the predefined potential to the selected gate electrode.

During measurement by addressing one gate electrode, the potential of other gate electrodes may be left floating or grounded.

When at least two gate electrodes are identical, these at least two gates may be addressed in a sequence, and an average value computed based on the values measured for the successive selected gates.

The concentration of a specific analyte in the liquid to be analyzed, and thus of a corresponding analyte, may be determined by means of appropriate calibration curves of the sensor, in which the variation of the drain-source current is put into relation with a series of predetermined concentrations of the analyte in the sample.

The method may comprise applying a predefined depolarizing potential on the depolarizing electrode mentioned above, for de-doping the channel before applying the predefined potential to a selected gate.

The depolarizing potential is selected according to the nature of liquid media, analytes, ions and other dissolved species, as well as value of potential applied previously. Depolarizing potential should be chosen preferably not to provoke any additional electrochemical reactions in the liquid. The depolarizing potential applied between source and other electrodes lays preferably in the range that depends of the nature of conductive polymer (for example between −2V to 2V for PEDOT: PSS). This potential may be selected based on the value of the gate electrode potential immediately previously applied. Preferably, the higher in absolute value the gate electrode potential previously applied is, the lower the depolarizing potential is in absolute value. For example, the higher the positive gate potential previously applied is, the more negative the depolarizing potential applied after is.

A predefined time may elapse before two consecutive measurements. For example, elapse between addressing two different gates is at least 5 s for PEDOT: PSS based transistors, according to experiments.

The potential that is applied to a selected gate may differ depending the gate is functionalized of not.

The sensor made in accordance with the invention may be used for medical point of care diagnostics and preclinical analysis of different analytes concentrations in human or animal liquids such as saliva, sweat, serum, blood or urine.

The sensor may also be used for continuous analysis of food and beverage making process, such as fermentation and maturation of wine, beer or whiskey, fermentation of cheese and other dairy products, as well as pathogen and dangerous substance detection in food industry and for ecological purposes.

The method may further comprise the step of grounding all gate electrodes that are not selected.

Detection Device

The invention also relates to a detection device comprising at least one OECT based sensor of the invention.

This detection device may comprise a control circuit for selecting a gate electrode of the sensor by applying a predefined potential.

For example, during detection, the source electrode is grounded. A voltage is applied between the gate and source that is greater in absolute value than that applied between source and drain. The gate voltage may be constant during measurement. In case of potential variation at the gate/electrolyte interface, depending on analyte concentration, potential variation at the electrolyte/channel interface also takes place, which results in a change of the redox state of the conductive polymer of the channel. Since the amount of charge carriers in the conductive polymer changes, the current between source and drain electrodes also changes, and can be detected by the control circuit.

The control circuit may be configured for applying a predefined de-polarizing potential before addressing a gate electrode.

The sensor may be used in vitro or in vivo.

BRIEF DESCRIPTION OF THE DRAWINGS

The invention will be better understood upon reading the detailed description that follows, of exemplary embodiments of the invention, and in view of the attached drawing, in which:

FIG. 10 is a cross-sectional schematic view illustrating a variant embodiment with a ion-selective membrane.

DETAILED DESCRIPTION

Figure 1:
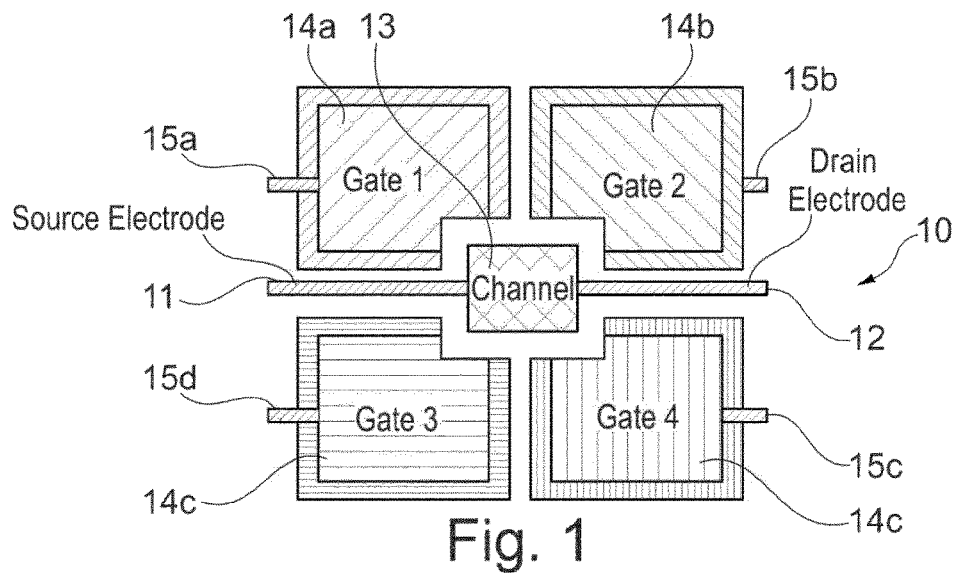
FIG. 1 is a schematic and partial representation in top view of an example of OECT based sensor made in accordance with the present invention, FIG. 2. is a schematic and partial perspective view illustrating a first configuration of the electrodes.

FIG. 1 shows an OECT sensor 10 made in accordance with the invention.

The sensor 10 comprises a source electrode 11, a drain electrode 12, a channel 13 and a plurality of gate electrodes 14.

In FIG. 1, there are four gates 14a to 14d, but the number of gates could be different without departing from the invention.

Figure 6:
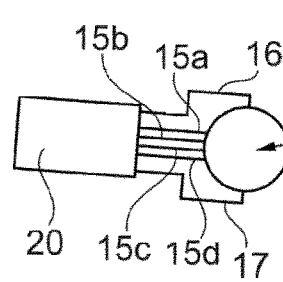
FIG. 6 shows a measuring device including a sensor in accordance with the invention.

Gates 14a to 14d are connected to a control device 20 by respective leads 15a to 15d, as shown in FIG. 6.

The source 11 and drain 12 electrodes are connected to the control device 20 by respective leads 16 and 17.

The control device 20 is configured to apply predefined potentials on the gates 14a to 14d according to a measuring sequence. The control device may be microcontroller based.

The gates 14 may be functionalized to be sensitive to respective species and the gates may be controlled in a sequence to make measurements representatives of the concentration of these species.

In a variant, the gates 14 are sensitive to a same species, and the gates are controlled in a sequence to make successive measurements of a same analyte. These measurements may then be averaged. When the gates 14 are intended to measure a same analyte with measures averaged, then preferably the gates are identical. Extracting an average value may prove useful in case of highly inhomogeneous analytes in the medium under study.

The electrodes may be made by ink-jet printing on a suitable substrate, such as glass, using for example a silver ink such as Sigma Aldrich Silver Nanoparticle ink, which is then annealed to form conductive base layers.

The channel 13 electronically conductive layer may consist of small organic and inorganic molecules, conjugated polymers (CPs) in either intentionally doped or pristine form with electrochemical doping/dedoping properties. The conductive layer could conduct holes (p-type) or electrons (n-type).

CPs are composed of planar, rigid aromatic repeat units that typically template an extended ribbonlike macromolecular conformation. Most of the devices to date rely on well-established CPs such as polypyrrole (PPy), polyaniline, and, predominantly, polythiophene derivatives such as doped poly(3,4-ethylenedioxythiophene) (PEDOT).

PPy could be used in its pristine form or doped by various dopants, such as paratoluene-2-sulfonic acid (PTSA), sodium dodecylbenzene sulfonate (SDBS) or sodium dodecyl sulfate (SDS).

Polyaniline could be also used in a doped form (with phytic acid or HCl).

Poly(3,4-ethylenedioxythiophene) could be doped with various dopants, including chloride anions as well as small molecular anions such as tosylate, biodopants (negatively charged biomolecular agents such as synthetic lipids, sugars, and laminin peptides and even living cells) and polyanions such as PSS.

PEDOT: S is such a CP with pendant sulfonate groups anchored onto the PEDOT backbone. Among n-type conductors one may use: perylene diimides (PDI), possibly functionalized with dioctyl side chains (i.e., PTCDI-C8), naphtalene diimide dithiophene copolymer P(NDI2OD-T2), thiophene based copolymer with oligoethylene glycol side chains p(g2T-TT); naphtalene diimide dithiophene copolymer with oligoethylene glycol based side chains p(gNDI-g2T) and ladder-type conducting polymers such as poly(benzimidazobenzophenathroline) BBL.

Currently the most used CP are PPy; polyaniline; PEDOT: PSS; PEDOT-S; PTHS (tetrabutylammonium poly(6-(thiophen-3-yl)hexane-1-sulfonate); p(g2T-TT); p(gNDI-g2T).

The channel conductive layer may be made of poly(3,4-ethylenedioxythiophene) polystyrene sulfonate (PEDOT: PSS). This polymer may be deposited by printing. Preparation of the PEDOT: PSS ink is disclosed by Pappa A.-M. et al Organic Electronics for Point-of-Care Metabolite Monitoring. Trends in Biotechnology (2017).

This PEDOT: PSS ink may also be printed on the gates for further functionalization thereof, for example by deposition of (3-glycidyloxypropyl)trimethoxysilane (GOPS). In such an example, the PEDOT: PSS ink may comprise polyvinyl alcohol because it has hydroxyl groups that are used for further bonding of GOPS through a reaction of condensation.

The gates may be functionalized for detection of glucose as disclosed by Zhu, Z-T et al, A simple poly(3,4-ethylenedioxythiophene) polystyrene sulfonate transistor for glucose sensing at neutral pH, Chemical Communications, 1556-1557 (2004), Macaya, D. J. et al, Simple Glucose sensors with micromolar sensitivity based on organic electrochemical transistors. Sensors and Actuators, B: Chemical 123, 374-378 (2007) or Bernards, D. A. et al, Enzymatic sensing with organic electrochemical transistors, Journal of Material Chemistry 18, 116-120 (2008), for detection of lactate, as disclosed by Jia, W. et al, Electrochemical tatoo biosensors for real-time non invasive lactate monitoring in human perspiration. Analytical Chemistry 85, 6553-6560 (2013), for detection of liposome as disclosed by Tarabella, G. et al. Liposome sensing and monitoring by organic electrochemical transistors integrated in microfluidics. Biochimica et Biophysica Acta (BBA)-General Subjects 1830, 4374-4380 (2013), for the detection of dopamine as disclosed by Tang, H. Lin, P. Chan, H. L. & Yan, F. Highly sensitive dopamine biosensors based on organic electrochemical transistors, Biosensors and Bioelectronics 26, 4559-4563 (2011), for the detection of DNA as disclosed by Lin P, Luo, X. Hsing, I & Yan, F. Organic electrochemical transistors integrated in flexible microfluidics systems and used for label-free DNA sensing, Advanced Materials 23, 4035-4040 (2011) or for the detection of IgG as disclosed by Macchia, E. et al, Ultra-sensitive protein detection with organic electrochemical transistors printed on plastic substrate.

In the example shown in FIG. 1, the gates 14a to 14d have a same shape but in variants (not shown) the gates have different shapes and/or sizes.

Figure 2:
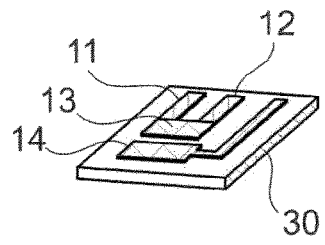

The source and drain electrodes 11, 12 and the gate electrodes 14 may be coplanar on a same substrate 30, as shown in FIG. 2. This allows a simultaneous and easy fabrication, for example by ink-jet printing, of all electrodes.

Figure 3:
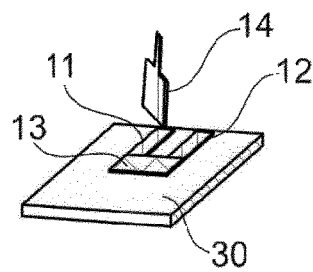
FIG. 3 is an embodiment of the invention.

In a variant, as shown in FIG. 3, the gates 14 are not coplanar with the source 11 and drain 12 electrodes.

Figure 4:
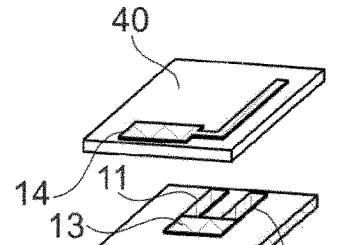
FIG. 4 is a variant embodiment of FIG. 3.

The gates 14 may be carried by a substrate 40 that is parallel to the substrate 30 carrying the source 11 and drain 12 electrodes, as shown in FIG. 4.

The sensor 10 may comprise only one set of source 11 and drain 12 electrodes connected to a corresponding channel 13.

Figure 5:
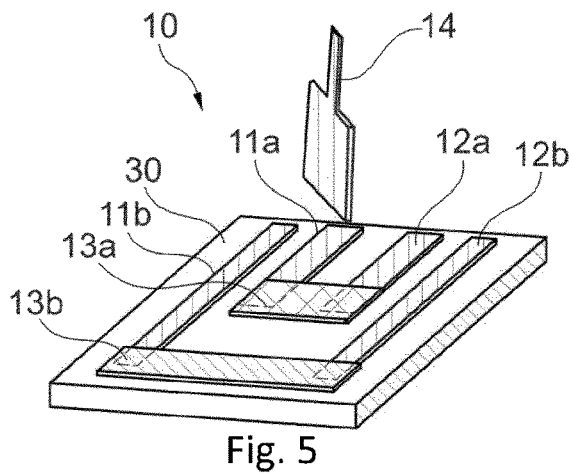
FIG. 5 is a variant embodiment of FIG. 3.

In a variant, as shown in FIG. 5, the sensor 10 comprises at least two such sets.

In the example of this Figure, the sensor comprises a first set of source 11a and drain 12a electrodes, connected to a respective channel 13a, and a second set of source 11b and drain 12b electrodes, connected to a respective channel 13b.

The channels 13a and 13b do not have the same geometric features or materials, so that their response is different. For example, one channel may be based on n-type material as one of those listed above and the other channel may be based on p- type material such as PEDOT: PSS for example.

The channels may be coplanar, as shown, or be non-coplanar (variant not shown).

The invention is not limited to the disclosed embodiments.

Figure 7:
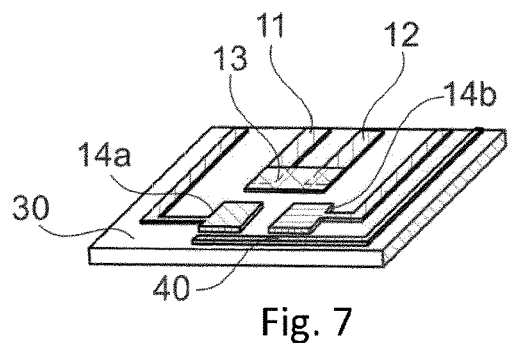
FIG. 7 is a schematic and partial perspective view illustrating a variant embodiment with a depolarizing electrode.

For example, the sensor may comprise a depolarization electrode 40 as shown in FIG. 7, on which a specific potential is applied between measurements. Potential applied between this electrode 40 and the source electrode 11 between each functional gate-source potential application is assuring fast de-doping of the channel. The depolarization electrode 40 may extend on the substrate 30 parallel the channel 13, with the gate electrodes situated between the depolarizing electrode 40 and the channel 13.

Figure 8:
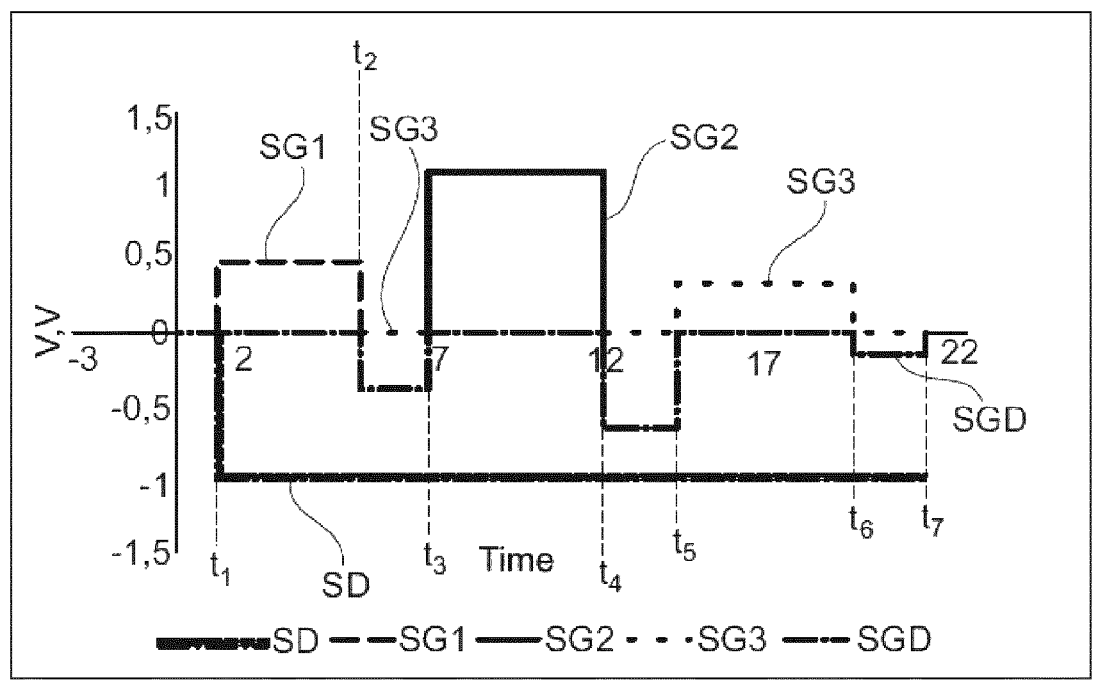
FIG. 8 is an example of possible chronogram of applied potentials for a sensor with source, drain, three functionalized gate electrode and one depolarized gate electrode.

FIG. 8 is an example of possible chronogram of applied potential. In this Figure, SD is the potential applied between source and drain electrodes; SG1 is the potential applied between source and first gate electrodes; SG2 is the potential applied between source and second gate electrodes; SG3 is the potential applied between source and third gate electrodes; and SGD is the potential applied between source and depolarized gate electrodes.

For the duration of the measurements, i.e. from t1 until at least t7, the potential SD varies from 0V to a negative value of about −1V for example. SD remains constant at this negative value in the interval t1-t7.

For measurement with first gate electrode, the potential SG1 is set at a positive value of about 0.5V, while other potentials SG2, SG3 and SGD remains at 0V.

Then, at t2, SG1 is set back to 0V while SGD varies from 0V to a negative value of about a little less than −0.5 V for example.

At t3, the measurement is made using the second gate by setting SG2 to a positive value of about a little more than 1V for example.

The other potentials SG1, SG3 and SGD remain at 0V.

Then, at t4, a depolarizing potential SGD is applied until t5. SGD may be set to a lower negative value than between t2 and t3; to consider the fact that the gate potential SG2 was higher than SG1.

At t5, the measurement is made using the third gate by setting SG3 to a positive value less than SG1, for example about 0.3V.

The other potentials SG1, SG2 and SGD remain at 0V.

Then, at t6, a depolarizing potential SGD is applied until t7. SGD may be set to a higher negative value than between t2 and t3; to consider the fact that the gate potential SG3 was lower than SG1.

Figure 9:
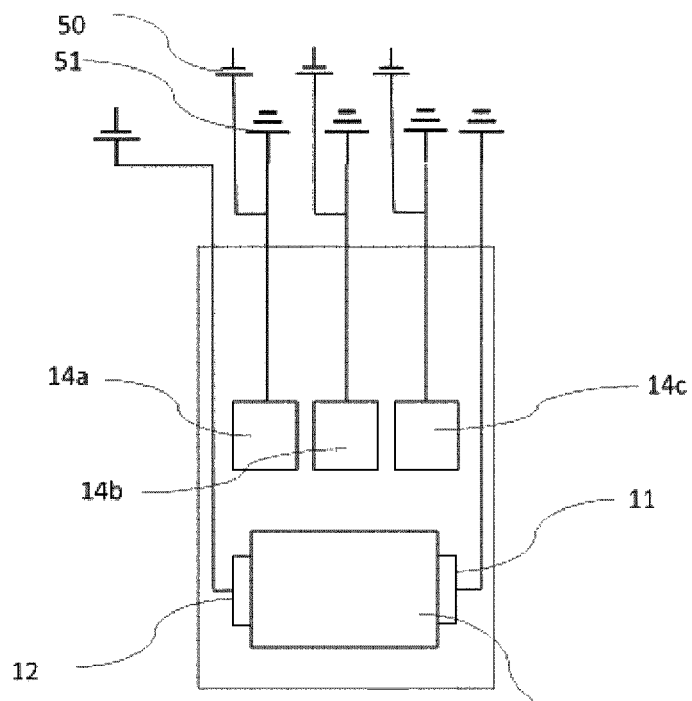
FIG. 9 is a schematic and partial view illustrating a variant embodiment with gate electrode sequentially connected to the ground and a source of potential.

A configuration possible to perform such sequence of measurement is represented on FIG. 9. The source electrode 11 is connected to the ground and a potential is applied between the source 11 and drain 12 electrodes. Each gate electrode 14a to 14c is selectively connected to a source of potential 50 or to the ground 51. This configuration allows that during a cycle of measurements each gate electrode 14a to 14c is either grounded or a potential is applied to it.

Since all gate electrodes 14a to 14c are interfering with the analyte simultaneously, the measurement signals are detected simultaneously from every gate electrode. In order to improve the precision of measurements, it is possible to separate the signals detected by each gate electrode 14a to 14c. To perform this separation of signals, it is possible to mute every electrode but one. The muting of a gate electrode is performed for example by grounding this gate electrode.

Preferably, during a cycle of measurements a potential is applied to only one of the gate electrodes and all the other are grounded.

For example, to read the signal coming only from the gate electrode 14a it is necessary to apply potential only between gate electrode 14a and the source electrode 11 and to ground gate electrodes 14b and 14c.

Such configuration is preferably used when at least two gate electrodes are being differently functionalized, even more preferably when all gate electrodes are being differently functionalized. Therefore, with this method, when all gate electrodes are being differently functionalized, each one can give precise information about the molecule to which the functionalization of the gate electrode is sensitive.

FIG. 10 shows an OECT sensor 10 with its channel 13 covered by a ion-selective membrane 60, for example a polymeric ion-selective membrane comprising at least one ionophore, such as ionophores selective for sodium, potassium, lithium, hydrogen, calcium, magnesium and ammonium ions. The membrane 60 filters species in the analyte that penetrate into the channel 13 in order to measure only selected species. This membrane is particularly useful when the analytes is a human or animal liquids such as saliva, sweat, serum, blood or urine. Indeed, those liquids are complex and comprise a lot of different species.

For example, the ion-selective membrane may be a polymeric membrane comprising at least one polymer, a plasticizer and at least one ionophore specific to a particular ion.

Polymers for use in the ion-selective membrane include polymers capable of forming thin films of sufficient permeability to produce, in combination with the ionophores, apparent ionic mobility thereacross. For example, the ion-selective polymeric membrane may include polyvinyl chloride.

The plasticizer aims at providing ion mobility in the membrane. The plasticizer may be chosen from plasticizers compatible with the membrane polymer and being a solvent for the ionophore. Examples of plasticizers include trimellitates, bromophenyl phenyl ether, dimethylphthalate, dibutylphthalate, dioctylphenylphosphonate, bis(2-ethylhexyl)phthalate, octyldiphenyl phosphate, tritolyl phosphate, tris(3-phenoxyphenyl) phosphate, tris(2-ethylhexyl) phosphate, and dibutyl sebacate.

The ionophore used in the ion-selective membrane may be a substance capable of selectively associating or binding to itself preferentially a desired specific ion. As for example of ionophores selective to sodium, one may cite cyclic polyethers.

In the variant where the sensor 10 comprises more than one channel 13, at least one channel may be covered by an ion-selective membrane and the other(s) may be uncovered. In a variant, at least two channels may be covered by different ion-selective membranes that are specific to different ions.

The invention claimed is:

1. A detection device comprising an Organic Electro-Chemical Transistor (OECT) based sensor, comprising:
   at least one set of source and drain electrodes;
   a plurality of gate electrodes for said at least one set;
   at least one channel connected to the source and drain electrodes of the at least one set;
   at least one depolarizing electrode, the at least one depolarizing electrode extending on a substrate parallel the at least one channel, wherein the plurality of gate electrodes are situated on the substrate between the at least one depolarizing electrode and the at least one channel; and
   wherein at least two gate electrodes of said plurality of gate electrodes are differently functionalized and said detection device is configured for applying a predefined potential on the at least one depolarizing electrode for de-doping said at least one channel before addressing a gate electrode of said plurality of gate electrodes.

2. The detection device of claim 1, the source and drain electrodes of the at least one set being coplanar on the substrate.

3. The detection device of claim 1, the plurality of gate electrodes being coplanar on the substrate with the source and drain electrodes of the at least one set.

4. The detection device of claim 1, the plurality of gate electrodes on one end of the substrate and the source and drain electrodes of the at least one set on another end of the substrate extending in respective parallel planes.

5. The detection device of claim 1, the at least two gate electrodes being made of different materials.

6. The detection device of claim 1, wherein the at least two gate electrodes of said plurality of gate electrodes that are differently functionalized are selectively sensitive to different concentrations of a same analyte.

7. A method for producing the OECT based sensor according to claim 1, comprising:
   ink jet printing the source and drain electrodes of the at least one set and the plurality of gate electrodes, and
   functionalizing differently at least two gate electrodes of the plurality of gate electrodes.

8. A method of detecting at least one analyte in a medium, using the detection device of claim 1, comprising:
   selecting a gate electrode of the plurality of gate electrodes,
   applying a predefined potential to the selected gate electrode, and
   determining a concentration of an analyte based on a current measured between the source and drain electrodes of the at least one set during application of the predefined potential to the selected gate electrode.

9. The method of claim 8, wherein a specific potential is applied on the at least one depolarizing electrode between measurements, said method comprising applying the specific potential on the at least one depolarizing electrode for de-doping the at least one channel before applying the predefined potential to the selected gate electrode.

10. The method of claim 8, further comprising the following step:
    grounding all gate electrodes of the plurality of gate electrodes that are not selected.

* * * * *